US005095234A

United States Patent [19]

Hara

[11] Patent Number: 5,095,234

[45] Date of Patent: Mar. 10, 1992

[54] ELECTROMAGNETIC SOLENOID

[75] Inventor: Tadayuki Hara, Himeji, Japan

[73] Assignee: Mitsubishi Denki Kabushiki Kaisha, Tokyo, Japan

[21] Appl. No.: 662,150

[22] Filed: May 9, 1945

[30] Foreign Application Priority Data

Oct. 24, 1983 [JP] Japan ................................ 58-198656

[51] Int. Cl.[5] ........................ H02K 1/04; H02K 41/00

[52] U.S. Cl. ........................................ 310/43; 310/14; 310/45; 336/205

[58] Field of Search ........................ 310/43, 45, 30, 14, 310/12, 34, 35; 336/204-206

[56] References Cited

U.S. PATENT DOCUMENTS

| | | | |
|---|---|---|---|
| 1,303,511 | 5/1919 | Shackelton | 336/205 |
| 2,920,297 | 1/1960 | Spicer | 336/205 X |
| 4,204,181 | 5/1980 | Smith | 310/434 |
| 4,356,417 | 10/1982 | Smith | 310/434 |

*Primary Examiner*—Mark O. Budd

*Attorney, Agent, or Firm*—Oblon, Spivak, McClelland, Maier & Neustadt

[57] ABSTRACT

An electromagnetic solenoid comprises a coil wound around a coil case and a plunger inserted into the coil so as to be slidable in the axial direction, wherein a tape impregnated with a thermosettable resin is wound on the trunk portion of the coil case and the coil is wound on the wound tape.

5 Claims, 1 Drawing Sheet

ELECTROMAGNETIC SOLENOID

BACKGROUND OF THE INVENTION

1. Field of the Invention

The present invention relates to a control valve of a type of electromagnetically proportional operation (an electromagnetic solenoid) used for an electronic-controlled power steering system (EPS) for a car. More particularly, it relates to an improvement in a coil bobbin installed in the control valve.

2. Discussion of the Background

There has so far been known a device as shown in FIG. 1 which was published, for example, in Japanese Utility Model Publication No. 35009/1982.

In FIG. 1, a reference numeral 1 designates a solenoid device, a numeral 2 designates a solenoid coil, a numeral 3 designates a plunger (movable iron core) capable of sliding in the direction of the arrow mark, a numeral 4 designates a push rod fixed to the top end of the movable iron core 3, a numeral 5 designates a valve body (an oil pressure valve body) connected to the front end of the solenoid device 1, a numeral 6 designates a spool which is arranged in the valve body 5 and is moved in its axial direction of the valve body 5 by pressure caused by the sliding movement of the plunger 3, a numeral 7 designates a spring bearing, a numeral 8 designates a spring and characters T, A and P designate oil pressure flow paths.

The operation of the solenoid device having the construction as described above will be illustrated.

When the solenoid coil 2 is actuated by current conduction from an external d.c. power source device, the movable iron core 3 is moved in the direction of the arrow mark to push the push rod 4. A pressing force of the push rod 4 is transmitted to the spool 6 and the spool 6 is caused to slide on the left hand in FIG. 1, pressing the spring 8. During the sliding movement of the spool 6, the oil pressure flow paths T, A and P are changed.

In the conventional device constructed as above-mentioned, since pressure oil (working oil) is filled in a space receiving the plunger 3, the pressure oil is apt to leak out to enter into the solenoid coil 2. Further, the inner diameter part of the solenoid coil 2 shrinks due to tension produced at the time of winding a coil thereby to cause difficulty in sliding movement of the plunger.

SUMMARY OF THE INVENTION

It is an object of the present invention to eliminate the disadvantage of the conventional device and to provide an electromagnetic solenoid capable of prevention of the leakage of pressure oil and providing smooth sliding movement of a plunger as well as improvement in airtightness of the device and increasing reliability of the operation.

The present invention to provide an electromagnetic solenoid comprising a coil wound around a coil case and a plunger inserted into the coil so as to be slidable in the axial direction, characterized in that a tape impregnated with thermosettable resin is wound about the trunk portion of the coil case and the coil is wound on the wound tape.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawing, wherein.

DETAILED DESCRIPTION OF THE PREFERRED EMBODIMENTS

An embodiment of the present invention will be described with reference to drawing.

Figure 1:
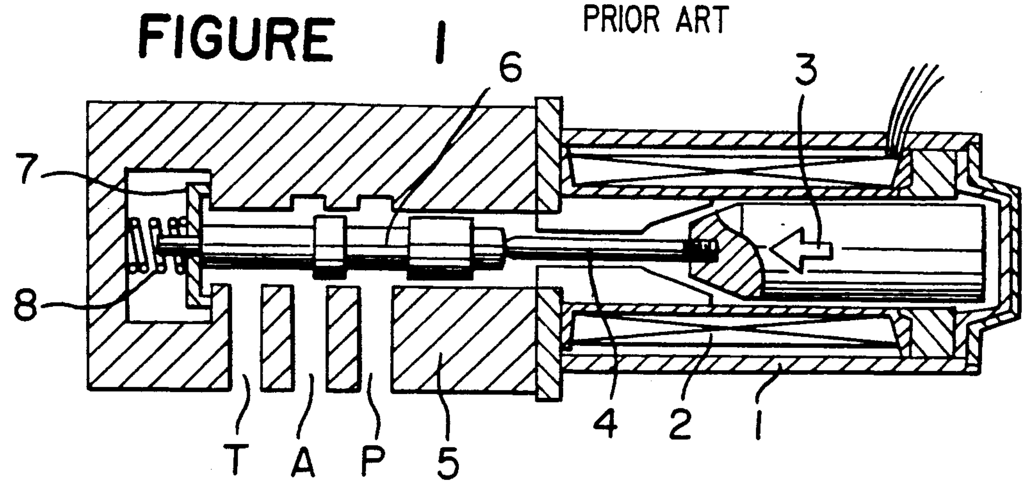
FIGURE 1 PRIOR ART
FIG. 1 is a cross-sectional view of a conventional solenoid device.
Figure 2:
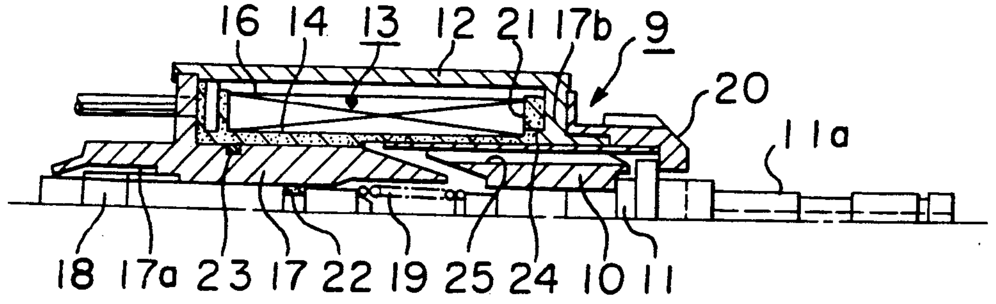
FIG. 2 is a cross-sectional view of the upper half portion of an embodiment of the electromagnetic solenoid according to the present invention.
Figure 3:
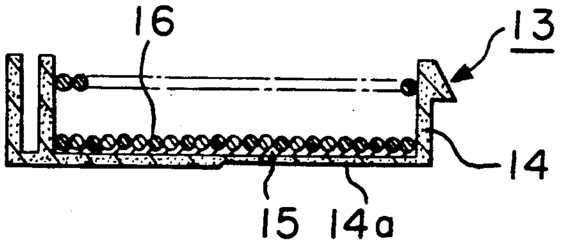
FIGS. 3 and 4 are respectively longitudinal cross-sectional views of an important part of the present invention.
Figure 4:
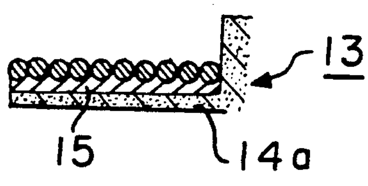

In FIGS. 2–4, a numeral 9 designates an electromagnetic solenoid attached at its front end part with a valve body (oil pressure control valve) though it is not shown in Figures, a numeral 10 designates a plunger (a movable iron core) of the electromagnetic solenoid 9, a numeral 11 designates a rod made of a non-magnetic substance firmly connected to the plunger 10. A spool part 11*a* is formed at the front end part of the rod 11. A numeral 12 designates a solenoid case made of soft steel material, a numeral 13 designates a coil bobbin which is constituted by a coil case 14 formed by molding a resinous material, a tape 15 impregnated with a thermosettable resin wound around the trunk part (cylinderical part) 14*a* of the coil case 14 and a coil 16 wound on the thermosettable resin impregnation tape with a number of turns. As the thermosettable resin, epoxy series resin is preferably used to form a epoxy glass tape (a prepreg tape). For example, epoxy resin is impregnated and coated at a thickness of 0.06 mm in and on a glass based tape of 0.07 mm thick to form a tape having a thickness of 0.13 mm. After winding the coil 16 on the wound glass tape, the coil bobbin 13 is subjected to heating to melt and cure the thermosettable resin on the tape 15. Then, the thermosettable resin enters into the inner layers of the coil 16 to relax stress produced at the time of winding the coil 16. For example, even when oil temperature rises at about 120° C. to cause expansion of the coil, there is, allowance of 0.06 mm for the coating layer which has entered into the inner layers of the coil, thus the stress due to the expansion of the coil is released. Further, the cured tape 15 on the coil case 14 in a layer form separates the inner layer of the coil 16 from the coil bobbin 13 whereby leakage of the pressure oil into the coil 16 can be prevented even though a crack is produced in the trunk part 14*a* of the coil case 14. A reference numeral 17 designates a stationary iron core, a numeral 18 designates a screw rod for adjusting pressure of return spring, which is screw-engaged with the central through hole 17*a* of the stationary iron core 17, a numeral 19 designates a return spring extending between the front end part of the screw rod 18 and the rear end part of the rod 11 to return the plunger 10. A numeral 20 designates a boss fitted at the front end part of the solenoid case 12 and is firmly attached to the oil pressure valve body (not shown). Numerals 21, 22 and 23 respectively designate o-rings which function to prevent leakage of the pressure oil at the side of the coil bobbin 13. A numeral 24 designates a sleeve fitted to a front through hole 17*b* of the solenoid case 12, a numeral 25 designates a groove (an oil pressure releasing part) formed in the outer circumferential part of the plunger 10 and the groove is formed in such a manner that the pressure oil is released from the groove 25 at the time of movement of the plunger. The groove (the oil pressure releasing part) 25 is formed by shaving the plunger 10 from the front end part to the rear end part in the axial direction (moving direction) of the plunger 10. The oil pressure releasing part 25 may be a through hole passing through the plunger 10 in the axial direction (moving direction) of the plunger.

The operation of the device according to the present invention is the same as that of the conventional device. However, since a tape impregnated with a thermosettable resin is wound on the trunk part of a coil case and a coil is wound on the resin impregnation tape, crack and shrinkage of the coil case 14 are not produced due to tension produced at the time of winding the coil and there is no risk of leakage of the pressure oil. Accordingly a reliable and smooth sliding operation of the plunger can be obtained with simple and economical structure. Further, air tightness of the device is improved and reliability of the operation is remarkably improved

I claim:

1. An electromagnetic solenoid comprising:

an annular coil case having a cylindrical part;

a plunger positionable in said cylindrical part for movement along a longitudinal axis of said cylindrical part;

a tape impregnated with a thermosettable resin would about a radially outer surface of said cylindrical part; and an electric coil wound on said cylindrical part and over said wound tape, whereby said electric coil is separated from said cylindrical part by said wound tape, and whereby said resin relaxes stresses produced in said coil during the winding thereof.

2. The electromagnetic solenoid according to claim 1, wherein said coil case is formed of a molded resinous material and said tape is impregnated with a thermosettable resin, is heated and is solidified after said coil has been wound.

3. The electromagnetic solenoid according to claim 1, including an oil pressure control valve connected to said plunger.

4. The electromagnetic solenoid according to claim 1, wherein said thermosettable resin is epoxy series resin.

5. The solenoid of claim 1, wherein said coil case is formed of an insulating material.

* * * * *

UNITED STATES PATENT AND TRADEMARK OFFICE

CERTIFICATE OF CORRECTION

PATENT NO. : 5,095,234

DATED : March 10, 1992

INVENTOR(S) : Tadayuki Hara

It is certified that error appears in the above-identified patent and that said Letters Patent is hereby corrected as shown below:

On the Title page, item [22], should be --October 18, 1984--.

Signed and Sealed this

Eighth Day of June, 1993

Attest:

MICHAEL K. KIRK

Attesting Officer

*Acting Commissioner of Patents and Trademarks*